United States Patent [19]

Bode et al.

[11] Patent Number: 5,451,329
[45] Date of Patent: Sep. 19, 1995

[54] DEWATERING OF ALUMINA TRIHYDRATE

[75] Inventors: Skip Bode, Metairie, La.; Patrick Bair, Conroe, Tex.; Donald P. Spitzer, Fairfield, Conn.

[73] Assignee: Cytec Technology Corp., Wilmington, Del.

[21] Appl. No.: 209,795

[22] Filed: Mar. 10, 1994

[51] Int. Cl.⁶ ............................................. B01D 37/03
[52] U.S. Cl. ........................... 210/728; 210/729; 210/778; 209/5; 423/122; 423/130
[58] Field of Search ............... 210/725, 727, 728, 729, 210/770, 772, 778; 423/121, 122, 130; 209/5

[56] References Cited

U.S. PATENT DOCUMENTS

| | | | |
|---|---|---|---|
| 2,864,765 | 12/1958 | Stoneman et al. | 210/729 |
| 2,975,123 | 3/1961 | Head | 210/43 |
| 4,039,466 | 8/1977 | Matsuda et al. | 252/194 |
| 4,097,390 | 6/1978 | Wang et al. | 252/60 |
| 4,153,549 | 5/1979 | Wang et al. | 252/194 |
| 4,207,186 | 6/1980 | Wang et al. | 210/54 |
| 4,210,531 | 7/1980 | Wang et al. | 210/51 |
| 4,231,868 | 11/1980 | Wang et al. | 210/728 |
| 4,410,431 | 10/1983 | Roe | 210/728 |
| 4,525,281 | 6/1985 | Cooper | 210/735 |
| 5,011,612 | 4/1991 | Keeney | 210/712 |
| 5,167,831 | 12/1992 | Dimas | 210/728 |

FOREIGN PATENT DOCUMENTS

| | | |
|---|---|---|
| 58-17814 | 2/1983 | Japan. |
| 58-17815 | 2/1983 | Japan. |
| 58-17816 | 2/1983 | Japan. |
| 58-49415 | 3/1983 | Japan. |
| 58-49416 | 3/1983 | Japan. |

OTHER PUBLICATIONS

D. J. Fox et al., The Use of Surfactant Mixtures in the Dewatering of Alumina Trihydrate, *Light Metals* (1987), pp. 159–163.

K. L. Tricklebank et al., Characteristics of the Dewatering of Seed Hydrate, *Light Metals* (1989) pp. 97–101.

S. J. Puttock et al., Vaccum Filtration and Dewatering of Alumina Trihydrate—The Role of Cake Porosity and Interfacial Phenomena, *International Journal of Mineral Processing*, 17 (1986) 205–224.

S. J. Puttock et al.; *International Journal of Mineral Processing*, 16 (1986) 263–279, Characterization and Dewaterting of Australian Alumina Trihydrate.

D. J. Fox et al,; *International Journal of Mineral Processing*, 23 (1988) 85–92, The Influence of Bayer Liquor on the Dewatering of Alumina Trihydrate.

*Primary Examiner*—Peter A. Hruskoci
*Attorney, Agent, or Firm*—Frank M. Van Riet

[57] ABSTRACT

The use of a dewatering aid comprising a sulfosuccinate and an oil in the filtration of alumina trihydrate is disclosed.

6 Claims, No Drawings

DEWATERING OF ALUMINA TRIHYDRATE

BACKGROUND OF THE INVENTION

The Bayer Process for the recovery of alumina from bauxite ore is well known. The process entails the use of sodium hydroxide at temperatures ranging from about 120° to about 250° C. to extract the alumina. After the separation of the red muds, which are the insoluble residues remaining after the caustic reaction, the hydrated alumina is precipitated, after cooling, from the aluminate liquor, usually after seeding with seed crystals of trihydrate. The precipitated alumina trihydrate is then recovered, usually by filtration, and washed to remove moisture, i.e. residual liquor, which contains contaminants such as residual soda, which are detrimental to product quality.

It is well known to utilize various dewatering aids during the filtration process in order to assist in the removal of the moisture from the resultant filter cake so as to thereby minimize the cost of subsequent drying procedure.

A wide variety of dewatering aids have been employed for this purpose. U.S. Pat. No. 5,011,612 teaches the use of a $C_8$–$C_{20}$ fatty acid or fatty acid precursor such as an ester or amide by adding it to the wash water or liquor slurry. U.S. Pat. No. 5167831 teaches the use of fatty acids of at least 12 carbon atoms in admixture with various non-ionic surfactants of HLB from 10-14. The use of amino functional silicones in conjunction with water and at least one surfactant is taught in U.S. Pat. No. 4,525,281.

A series of Japanese patents describe the use of 1) anionic surfactants such as $C_{12}H_{25}C_8H_4SO_3$ Na and sodium olefin sulfonates (JP 58 17, 816; CA 99:89899q), 2) sulfosuccinic anionic surfactants and, optionally, nonionic surfactants (JP 58 49, 416; CA 99:89900h), 3) anionic surfactants of alkyl phosphate salts (JP 58 49, 415; CA 99: 89901j), 4) nonionic surfactants such as $C_{12}H_{25}O$ $(C_2H_4O)_5H$ (JP 58 17, 814; CA 99:107048t) and 5) alkyl sulfate anionic surfactants (JP 58 17, 815; CA 99:72605t) as dewatering aids in alumina trihydrate filtration. All of these references however, teach the use of the surfactant alone and only when added to the rinse water.

The use of dewatering aids in the filtration of mineral ores in general is also well known. U.S. Pat. No. 2,975,123 discloses the dewatering of various copper, iron and nickel sulfide or oxide ores using tertiary amino alkyl esters of fatty acids alone or in conjunction with a hydrocarbon oil while U.S. Pat. No. 4,039,466 teaches that various anionic surface active agents such as alkylbenzene sulfonates, sodium octylsulfosuccinates and polyethylene glycol types have been used to treat hydroextracted finely divided coal or silica but explains that these materials are not useful on finely pulverized ores. The patentee uses a nonionic compound having a polyoxyalkylene group and a cloud point of not more than 35° C. in conjunction with an anionic compound having a hydrophobic polyoxyalkylene group in the molecule. Mineral oils may be added to the composition which is useful on metal sulfides, metal carbonates, metal oxides, metal silicates, bauxite, sand, cassiterite, fluorite and silica.

U.S. Pat. No. 4,097,390 relates to the use of 1) an ethoxylated secondary alcohol, 2) a dialkylsuccinic acid or salt and 3) a mono (ethoxylated alcohol) carboxylate ester of a sulfosuccinic acid or salt in the dewatering of filter cakes resulting from the flotation of ores such as chalcopyrite.

U.S. Pat. No. 4,207,186 relates to the use of 1) a hydrophobic alcohol of 8-18 carbon atoms and 2) a nonionic surfactant of the structure R—(O $CH_2CH_2)_xOH$ as a dewatering aid in the filtration of coal, iron ore, sulfides, oxides etc whereas U.S. Pat. No. 4,210,531 relies on the use of a combination of anionic surfactants such as dialkylsulfosuccinates, petroleum sulfonates, fatty acid soaps, alkyl ether sulfonates, alkyl sulfonates, alkyl phosphates etc and water-insoluble organic liquids such as aliphatic hydrocarbons, aromatic hydrocarbons, aliphatic alcohols, aromatic alcohols, vegetable oils, animal oils etc to dewater copper and iron sulfides or oxides, salt minerals, coal refuse, fine coal etc. The only examples in this patent relate to coal treatment.

U.S. Pat. No. 4,231,868 teaches a process which dewaters coal and mineral concentrates using N-monosubstituted sulfosuccinamates e.g. copper and iron sulfides and oxides. Only iron ore is used in the examples.

In U.S. Pat. No. 4,410,431 there is disclosed the dewatering of coal, lead and taconite ores, glass sands etc with a blend of a tall oil fatty acid and an ethylene oxide adduct of a primary aliphatic alcohol. A commercial product designated as #2 comprising dioctylsulfosuccinate, sodium salt (85%) and #2 fuel oil (15%) is distinguished in the data graphically presented in the drawings.

A series of publications from Australia discuss dewatering of alumina trihydrate in considerable detail i.e. (a) D. J. Fox, M. S. Wainwright, S. J. Puttock, A. G. Fane, C. J. D. Fell, and R. G. Robbins, "The use of surfactant mixtures in the dewatering of alumina trihydrate." *Light Metals* (1987) 159-163; b) K. L. Tricklebank and M. S. Wainwright, "Characteristics of the dewatering of seed hydrate." *Light Metals* (1989(97-101; c) S. J. Puttock, A. G. Fane, C. J. D. Fell, R. G. Robins, and M. S. Wainwright, "Vacuum filtration and dewatering of alumina trihydrate—the role of cake porosity and interfacial phenomena." *Int. J. Mineral Processing* 17 (1986) 205-224; d) S. J. Puttock, M. S. Wainwright, J. W. McAllister, A. G. Fane, C. J. D. Fell, and R. G. Robins, "Characterization and dewatering of Australian alumina trihydrate." *Int. J. Mineral Processing* 16 (1986) 263-279; e) D. J. Fox, M. S. Wainwright, C. J. D. Fell, Y. C. Ho, A. G. Fane, and R. G. Robins, "The influence of Bayer liquor on the dewatering of a lumina trihydrate" *Int. J. Mineral Processing* 23 (1988) 85-92. These publications examine the use of a wide variety of surfactants for dewatering alumina trihydrate i.e. anionic surfactants (such as sodium lauryl sulphate and sodium dodecyl benzene sulphonate), cationic surfactants (such as cetyl trimethyl ammonium bromide and bis 2-hydroxyethyl cocoamine), and nonionic surfactants (such as ethoxylated alcohols and ethoxylated nonylphenols). Some combinations of surfactants were also used. In all cases, the surfactants were added to the wash water. Reference c also describes experiments in which an oil (olive oil or peanut oil) was added to the slurry before filtration and sodium dodecyl benzene sulphonate (SDBS) was added to the wash water. In these experiments, residual moistures were higher than obtained with the same dosage of SDBS alone.

All of the above references, while related to the subject matter of this invention, i.e. they all refer to the use of dewatering aids, are devoid of any teaching of the use of alkylsulfosuccinates in combination with oils in the dewatering of alumina trihydrate produced in the Bayer Process.

SUMMARY OF THE INVENTION

In dewatering, it is known that dewatering aids usually function either by decreasing surface tension or by increasing the contact angle of the liquid on the solid surface and the best dewatering aids probably affect both surface tension and contact angle. We have found that the application of mixtures of diaikylsulfosuccinates and oil leads to much better dewatering than the use of the dialkylsulfosuccinates or the oil alone. Although not wishing to be bound by any theory, we believe that the oil is involved in making the solid alumina trihydrate surface more hydrophobic, i.e. increasing the contact angle, than possible with the dialkylsulfosuccinate alone. The dialkylsulfosuccinate is important in dispersing the oil over the alumina trihydrate surface and in reducing the surface tension of the liquid. Once the surface is made hydrophobic, subsequent washing results in a drier cake and less associated impurities.

The dialkylsulfosuccinate/oil dewatering aids used in the present invention are surprisingly effective when added to the alumina trihydrate slurry prior to filtration in contrast to most of the dewatering aids of the prior art references discussed above where usual practice is to add the dewatering aid to the wash water. Although addition thereof to the slurry is not per se unique, see U.S. Pat. No. 4,525,281, for example, addition of the dewatering aid of the present invention to the wash water does not result in satisfactory results.

DESCRIPTION OF THE INVENTION INCLUDING PREFERRED EMBODIMENTS

The present invention comprises a process for reducing the moisture content of an alumina trihydrate filter cake which is formed in the Bayer Process by the filtration of a slurry of alumina trihydrate, wherein there is added to said slurry, i.e. before filtration, a dewatering aid comprising A) a dialkylsulfosuccinate and B) an oil.

The dialkylsulfosuccinates useful in the process of the present invention include those having the formula:

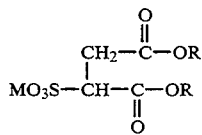

wherein each R is, individually, an alkyl group of from 6 to 20 carbon atoms and M is hydrogen, an alkali metal or ammonium.

Preferably, the R groups are the same and more preferably, both R groups are $C_8$–$C_{14}$ alkyl groups. Most preferably, the R groups are both 2-ethylhexyl or octyl groups. M is preferably sodium.

A wide variety of oils can be used in the process of the present invention with water-insoluble hydrocarbon oils i.e. paraffinic oils, aromatic oils i.e. naphthenic oils being exemplary. Additionally, such oils as odorless mineral spirits, fuel oil, white oil, kerosene, coal oil, refined tall oil, mineral oil, vegetable oil, mineral seal oil, peanut oil, olive oil residues of $C_{10}$ alcohol distillation etc, and mixtures of any of the above, can be used. Odorless mineral spirits is preferred.

The concentration, by weight, of the dialkylsulfosuccinate and the oil should range from about 95/5 to 5/95, respectively, and most preferably from about 50/50 to 30/70, respectively.

The dialkylsulfosuccinate and the oil can be added to the alumina trihydrate individually or in admixture, however, in order to obtain the most beneficial results it is preferred that they be added together. If added separately, they should be added as closely together as possible and the dialkylsulfosuccinate should preferably be added first.

Addition of the dewatering aid to the alumina trihydrate stream of the Bayer Process plant should be accomplished as near the filter as possible, preferably less that about 30 seconds before the slurry reaches the filter, more preferably less than about 20 seconds before.

Examples of useful dialkylsulfosuccinates include:
sodium dihexylsulfosuccinate;
sodium dioctylsulfosuccinate;
sodium dimethylheptylsulfosuccinate;
sodium bis (2-ethylhexyl) sulfosuccinate;
sodium dinonylsulfosuccinate;
sodium didecylsulfosuccinate;
sodium diundecylsulfosuccinate;
sodium didodecylsulfosuccinate;
sodium bis(tridecyl)sulfosuccinate;
sodium dioctadecylsulfosuccinate and their corresponding potassium, lithium, and ammonium etc salts.

The following examples are set forth for the purpose of illustration only are not to be construed as limitations on the present invention except as set forth in the appended claims. All parts and percentages are by weight unless otherwise specified.

PROCEDURE OF TESTING

Alumina trihydrate slurry is collected from an operating Bayer plant just prior to filtration. The slurry is divided into equal aliquots stored at 60° C. until use. Dewatering aids are made up as 0.5% solutions in process water (as normally used in the plant for the final wash). Each aliquot of slurry is vigorously stirred on a magnetic stir plate, the dewatering aid (or equal amount of plant water) is added and stirring is continued for 15 seconds. The slurry is then quickly poured into a Buchner funnel containing Whatman #4 filter paper, with a vacuum of 25 psig. The time to initial surface dryness is recorded, then at 30 seconds from the start of filtration, one-half the volume of the original aliquot of water at 80° C. is added and the wash time (to surface dryness) is also recorded. After 90 seconds from the start, the vacuum is turned off, the wet cake is weighed, then dried at 100°–105° C. and reweighed to determine percent moisture. This procedure is similar to usual plant practice where the slurry discharges onto a pan and where vacuum is applied for a short fixed time, followed by one or two washes, also for relatively short fixed times, after which the cake is discharged to go to the driers.

EXAMPLE 1

Following the above Procedure of Testing, a dosage of 75 ppm of dewatering aid is added in each case to a series of aliquots. The results are set forth in Table I, below.

TABLE I

| Run No. | Dewatering Aid | Filtration Time Initial | Filtration Time Final | % Moisture |
|---|---|---|---|---|
| 1C | None* | 24 | 69 | 16.1 |
| 2C | Additive A | 22 | 66 | 14.6 |
| 3 | 90/10 A/B | 15 | 56 | 11.1 |
| 4 | 70/30 A/B | 20 | 58 | 13.0 |
| 5 | 50/50 A/B | 12 | 48 | 10.3 |
| 6 | 30/70 A/B | 10 | 55 | 10.8 |
| 7 | 10/90 A/B | 22 | 61 | 14.0 |
| 8C | Additive B | 32 | 79 | 15.3 |

\* = average of 3 tests
A = sodium dioctylsulfosuccinate
B = mineral spirits
C = Comparative As can be readily appreciated, the above results clearly demonstrate that faster filtration times and lower cake moisture i.e. improved dewatering, are attained using mixtures of the sulfosuccinate and oil as compared to either additive alone. Maximum improvement is shown with the composition containing 50–70% oil.

EXAMPLE 2

In an operating Bayer Process alumina plant, a mixture of 50/50 sodium dioctylsulfosuccinate and mineral spirits (as dewatering aid) is added in-line to an alumina trihydrate slurry stream at a rate of 65 ppm, based on the volume of slurry treated, approximately 20 seconds before the treated slurry reaches the vacuum pan filter. The alumina trihydrate is then filtered and washed as usual, i.e. washing first with a mixture of clean water and liquor and then with clean water only. When no dewatering aid is used, analysis of the amount of soda ($Na_2O$) left on the filtered alumina trihydrate crystal surfaces shows an average of 0.082%. Analysis after treatment with the dewatering aid shows an average of 0.044%.

This example shows that the process of the present invention not only results in increased dewatering (Example 1) but also a 46.0% reduction in residual soda.

EXAMPLE 3

The procedure of Example 2 is again followed except that the mixture of sodium dioctylsulfosuccinate and mineral spirits is added in-line to the alumina trihydrate slurry at a rate of 90 ppm. Analysis for residual soda ($Na_2O$) before and after the procedure shows an average of 0.035%. Analysis during the procedure shows an average of only 0.018% soda.

EXAMPLE 4

Again following the above Procedure of Testing, various dosages of either bis (tridecyl) sulfosuccinate (SBS) alone or as a 50/50 mixture with mineral spirits (MS) are added to the slurry aliquots. The results are set forth in Table II, below.

TABLE II

| Run | Dosage (ppm) | Percent Decrease In Moisture SBS Alone | Percent Decrease In Moisture 50/50 SBS/MS |
|---|---|---|---|
| 1 | 25 | 0 | 0 |
| 2 | 50 | 2 | 19 |
| 3 | 75 | 8 | 12 |
| 4 | 100 | 16 | 26 |

This example shows that the bis(tridecyl) sulfosuccinate surfactant alone does not provide satisfactory moisture reduction in the filter cake as compared to the mixture thereof with mineral spirits.

EXAMPLE 5

A. The procedure of Example 1 is again followed. The results are set forth in Table III, below.

TABLE III

| Run | Dewatering Aid | Dosage (ppm) | Relative Change in % Moisture Content*** |
|---|---|---|---|
| 1C | Additive A | 25 | +3; −14 |
| 2C | " | 50 | −4; −28 |
| 3C | " | 75 | −12; −5; −9; −2 |
| 4C | " | 100 | −21; −2 |
| 5 | 90/10 AB** | 75 | −31 |
| 6 | 70/30 A/B | 25 | −21; −12 |
| 7 | " | 50 | −7; −29 |
| 8 | " | 75 | −18; −31; −19 |
| 9 | " | 100 | −15; −18 |
| 10 | 50/50 A/B | 25 | −10; −6 |
| 11 | " | 50 | −5; −16 −20 |
| 12 | " | 75 | −7; −32; −36; −19 |
| 13 | " | 100 | −10; −34; −25 |
| 14 | 30/70 A/B | 25 | −8; 0 |
| 15 | " | 50 | −18; −19 |
| 16 | " | 75 | −19; −15; −33 |
| 17 | " | 100 | −12; −27 |
| 18 | 10/90 A/B | 75 | −13 |
| 19C | Additive D | 25 | −6; +6 |
| 20C | " | 50 | +3; −6 |
| 21C | " | 75 | −20; −14; −16; +18 |
| 22C | " | 100 | −14; −17 |
| 23 | 50/50 D/B | 25 | 0 |
| 24 | " | 50 | −19 |
| 25 | " | 75 | 0; −24 |
| 26 | " | 100 | −26 |
| 27 | Additive B | 75 | −5 |

\*see Table I for definitions
\*\*odorless mineral spirits
Additive D = sodium bis (tridecyl) sulfosuccinate
\*\*\*up to 4 tests run Table III clearly shows the unexpected effect of the use of the dewatering aids in accordance with the present invention in that increased moisture reduction is achieved via use of the mixture of sulfosuccinate and oil as compared to either component alone.

B. When the Dewatering Agent of Run 10, at the dosages of Runs 11–13, is added to the wash water rather than to the alumina trihydrate slurry, the change in percent moisture content of the cake is inconsistent, i.e. −29% at 50 ppm; +36% and +9.0% at 75 ppm and −21% at 100 ppm. No improvement in final filtration time is seen in any run.

EXAMPLE 6

The procedure of Example 1 is again followed except that the Dewatering Aid is a 30/70 mixture of sodium bis (2-ethylhexyl) sulfosuccinate and a #2 fuel oil, respectively. Similar results are achieved.

EXAMPLE 7

Again following the procedure of Example 2 except that the mixture used is of sodium dioctadecyl sulfosuccinate and kerosene, similar results are achieved.

EXAMPLE 8

The procedure of Example 1 is again followed except that the mineral spirits are replaced by mineral seal oil. Similar results are observed.

We claim:

1. In a process for reducing the moisture content of an alumina trihydrate filter cake which is formed in the Bayer Process by filtration of a slurry of alumina trihydrate, the improvement which comprises adding to said slurry of alumina trihydrate an effective amount of a dewatering aid consisting essentially of A) a dialkyl sulfosuccinate surfactant and B) a water insoluble oil, the concentration, by weight, of A) and B) ranging from about 95/5 to 5/95, respectively, wherein said sulfosuccinate has the formula

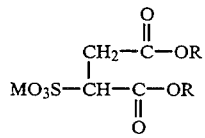

wherein each R is, individually, an alkyl group of from 6 to 20 carbon atoms, and M is hydrogen, an alkali metal or ammonium cation.

2. The process of claim 1 wherein R is an octyl group.

3. The process of claim 1 or 2 wherein M is sodium.

4. The process of claim 2 wherein said oil is a hydrocarbon oil.

5. The process of claim 2 wherein said oil is mineral spirits.

6. The process of claim 1 wherein said oil is a hydrocarbon oil.

* * * * *